(12) United States Patent  (10) Patent No.: US 7,958,741 B2
Pettitt  (45) Date of Patent: Jun. 14, 2011

(54) INTEGRALLY MOLDED MOTOR ISOLATION SYSTEM

(75) Inventor: Edward Douglas Pettitt, Burt, NY (US)

(73) Assignee: Delphi Technologies, Inc., Troy, MI (US)

(*) Notice: Subject to any disclaimer, the term of this patent is extended or adjusted under 35 U.S.C. 154(b) by 329 days.

(21) Appl. No.: 11/542,542

(22) Filed: Oct. 3, 2006

(65) Prior Publication Data

US 2007/0240846 A1    Oct. 18, 2007

Related U.S. Application Data

(60) Provisional application No. 60/791,337, filed on Apr. 12, 2006.

(51) Int. Cl.
 *F25B 13/00* (2006.01)
(52) U.S. Cl. ......................... 62/324.1; 62/407
(58) Field of Classification Search .............. 62/324.1, 62/295, 404, 407, 238.7, 160; 454/228, 231, 454/234, 341; 310/51, 89, 91; 165/42; 415/119
See application file for complete search history.

(56) References Cited

U.S. PATENT DOCUMENTS

| | | | |
|---|---|---|---|
| 3,746,894 A | 7/1973 | Dochterman et al. | 310/51 |
| 4,200,257 A | 4/1980 | Litch, III | 248/604 |
| 4,560,395 A * | 12/1985 | Davis | 96/381 |
| 4,742,691 A * | 5/1988 | Kennedy | 62/272 |
| 5,036,638 A * | 8/1991 | Kurtz, Jr. | 52/284 |
| 5,052,888 A | 10/1991 | Bolton et al. | |
| 5,449,153 A * | 9/1995 | Catalano et al. | 267/141.4 |
| 5,470,363 A * | 11/1995 | Leader et al. | 96/385 |
| 5,751,551 A * | 5/1998 | Hileman et al. | 361/753 |
| 5,760,512 A * | 6/1998 | Ohi et al. | 310/91 |
| 6,478,838 B2* | 11/2002 | McSweeney et al. | 55/467 |
| 6,552,457 B2* | 4/2003 | Uruma et al. | 310/91 |
| 6,631,243 B2* | 10/2003 | Reiker | 392/364 |
| 6,832,882 B2* | 12/2004 | Janisch et al. | 411/433 |
| 6,897,580 B2 | 5/2005 | White | 310/51 |
| 6,958,009 B2* | 10/2005 | Shindou et al. | 454/139 |

FOREIGN PATENT DOCUMENTS

| | | |
|---|---|---|
| DE | 196 13 041 | 10/1997 |
| EP | 0 848 476 | 6/1998 |
| JP | 05045038 A * | 2/1993 |
| JP | 2001324163 A * | 11/2001 |

OTHER PUBLICATIONS

Palm Inventor name Search of Edward Pettitt upto Jan. 9, 2009.*
English Machine translation of JPO Document JP-2001-324 163.*
English Abstract JP-05-045038 from EAST.*
Translation of JP 2001-324163 A to Gunji et al.*
European Search Report dated Jul. 31, 2007.

* cited by examiner

*Primary Examiner* — Mohammad Ali
(74) *Attorney, Agent, or Firm* — Patrick M. Griffin

(57) ABSTRACT

A heating, ventilation and air conditioning system includes a housing presenting an opening defining a rim surrounding a motor. A plurality of supports extend from the motor and a plurality of posts extend axially between a first end and a second end and interconnect the supports and the housing. The first ends of each post are supported by one of the supports and the second ends are supported by the housing with each of the posts being flexible for allowing for bending of the posts between the first end and the second end to allow for movement of the motor relative to the housing. In one embodiment, the first ends are upper ends and the second ends are lower ends and the housing includes an extension extending downwardly and a ledge extending radially inwardly. In another embodiment, the first ends are lower ends and the second ends are upper ends integral with the rim.

24 Claims, 3 Drawing Sheets

INTEGRALLY MOLDED MOTOR ISOLATION SYSTEM

CROSS REFERENCE TO RELATED APPLICATION

This application claims the benefit of provisional application No. 60/791,337, filed Apr. 12, 2006.

BACKGROUND OF THE INVENTION

1. Field of the Invention

A heating, ventilating and air conditioning (HVAC) system having a vibration isolation mechanism is provided to isolate vibrations of the motor.

2. Description of the Prior Art

Blower motors create a torsional vibration during their operation which can cause excitation of the HVAC module and thus noise. It is especially desirable in cooling air moving systems, to isolate vibrations originated by motor operations due to the intensifying effect of both the housing and the air conveying ductwork.

The torsional vibration created by a blower motor is related to the torque pulses that rotate the armature each time the current flows through the windings as the brushes contact the commutator bars. Since blower motors operate over a speed range (typically 1000 rpm to 4000 rpm), a fairly wide frequency range of the input torsional vibration is created. For example, a motor with 12 commutator bars will create torsional vibration from 200 Hz to 800 Hz as the motors speed sweeps from 1000 rpm to 4000 rpm.

These vibrations can create noise and to prevent noise problems, it is common to isolate the motors from the HVAC module. Isolation in effect lowers the natural frequency of the mechanical system such that input energy is attenuated in the problem frequency range.

To do this in HVAC motor applications it is common practice to use rubber materials to isolate the motor from the HVAC module. However, rubber isolation requires extra parts, extra processing and extra assembly and usually labor. Thus, rubber isolation adds cost. In addition, rubber isolation generally lowers stiffness in several directions which can cause increased vibration by shifting the resonant torsional mounting frequency below 200 Hz. It will also lower the radial mounting frequency which may amplify the $1^{st}$ order unbalance forces in the 16-67 Hz range.

In order to overcome some of the disadvantages of rubber isolation, radially extending plastic spokes have been designed to provide desired torsional stiffness to attenuate torsional vibration. However, for most motors the radial spokes will add considerable effective diameter to the motor assembly thus decreasing package density thereby increasing shipping costs. In addition a separate plastic sleeve or harness is needed on the motor to attach the plastic spokes.

Examples of isolation systems include U.S. Pat. No. 6,897,580 to White, U.S. Pat. No. 3,746,894 to Dochterman et al., and U.S. Pat. No. 4,200,257 to Litch III.

White describes a method of providing isolation via radially extending plastic spokes which extend outwardly from a sleeve surrounding the motor and are integral to the sleeve. Additional damping elements are disposed at the distal ends of each spoke and extend axially to form a connector for connecting the assembly to a casing. The casing has recesses for engagement with the spokes.

Dochterman describe a vibration isolation system having a rigid sleeve surrounding the motor, and a vibration isolator having a top and a bottom disposed between two clamping elements. Both clamping elements are secured to a casing and are disposed on the ends of the vibration isolator which is a rubber dumbbell shaped member. A support extends from the sleeve and is secured to the isolator between the top and bottom.

Litch III teaches an isolation system that uses three torsionally flexible post springs extending radially outwardly from the motor at an upward angle toward a casing. The post springs are pivotably secured to the casing.

Although the prior art effectively reduces the transmission of vibrational pulses, there is a continuing need for a cost effective means of reducing the transmission of vibration pulses while simultaneously maintain a desired radial and axial stiffness. Specifically, arms or posts that reduce package density and that achieve a desired stiffness are needed.

SUMMARY OF THE INVENTION AND ADVANTAGES

The invention provides for a heating, ventilating and air conditioning (HVAC) system comprising a housing presenting an opening and having an inlet for receiving air and a plurality of outlets for delivering air. A motor is disposed in the opening of the housing and has an axis extending between a top end and a bottom end for driving a blower to move air through the housing. A heat exchanger system is disposed in the housing for conditioning air moving through the housing. A plurality of mounting supports extend from the motor for mounting the motor on the housing and a plurality of posts extend axially between a first end and a second end and interconnect the supports and the housing for supporting said motor. The first end of each post is supported by one of the supports and the second end of each post is supported by the housing with each of the posts being flexible for allowing for bending of the post between the ends allowing movement of the motor relative to the housing while damping vibrations of the motor.

The invention provides a low cost means of isolating blower motors in the HVAC case by using specially designed integrally molded plastic isolation posts. These posts are designed to provide a desired torsional stiffness to target the natural frequency of the motor mounting system such that isolation/attenuation occurs in the commutation order frequency range. In addition, these posts are designed to provide adequate radial stiffness such that the radial resonant frequency is not shifted into the $1^{st}$ order operating range e.g. 16-67 Hz. The primary advantage of the invention over using radial spokes is lower cost as it eliminates the need for a plastic carrier on the motor and reduces packaging density. Also, greater flexibility of mounting design is achieved with the post design as they are easily molded within the lower HVAC case, can be molded on different planes, and can easily be designed to have different stiffnesses such that an overall desired stiffness is achieved. This invention also simplifies the assembly process because a snap fit design can be used to attach the motor to the posts. In addition, other attachment designs that allow the motor to be attached to the isolation posts via a press or interference fit are possible.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a heating, ventilating and air conditioning (HVAC) system 20 is generally shown.

Figure 1:
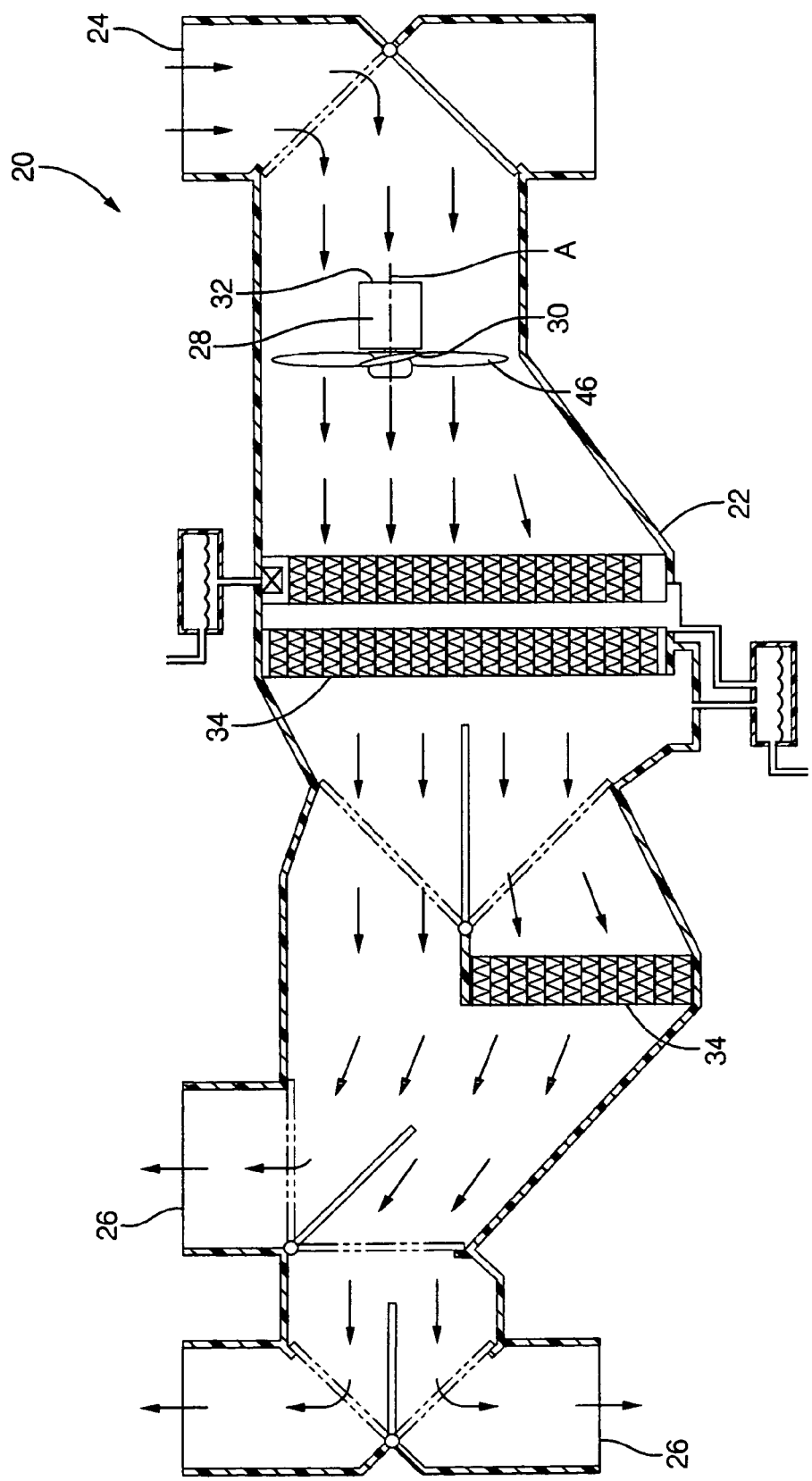
FIG. 1 is schematic of the HVAC system.

The system 20 includes a housing 22 having an inlet 24 for receiving air and a plurality of outlets 26 for delivering air as shown in FIG. 1.

A motor 28 is disposed in the housing 22 and has an axis A extending between a top end 30 and a bottom end 32 for driving a blower to move air through the housing 22. A heat exchanger system 34 is disposed in the housing 22 for conditioning the air moving through the housing 22.

Figure 2:
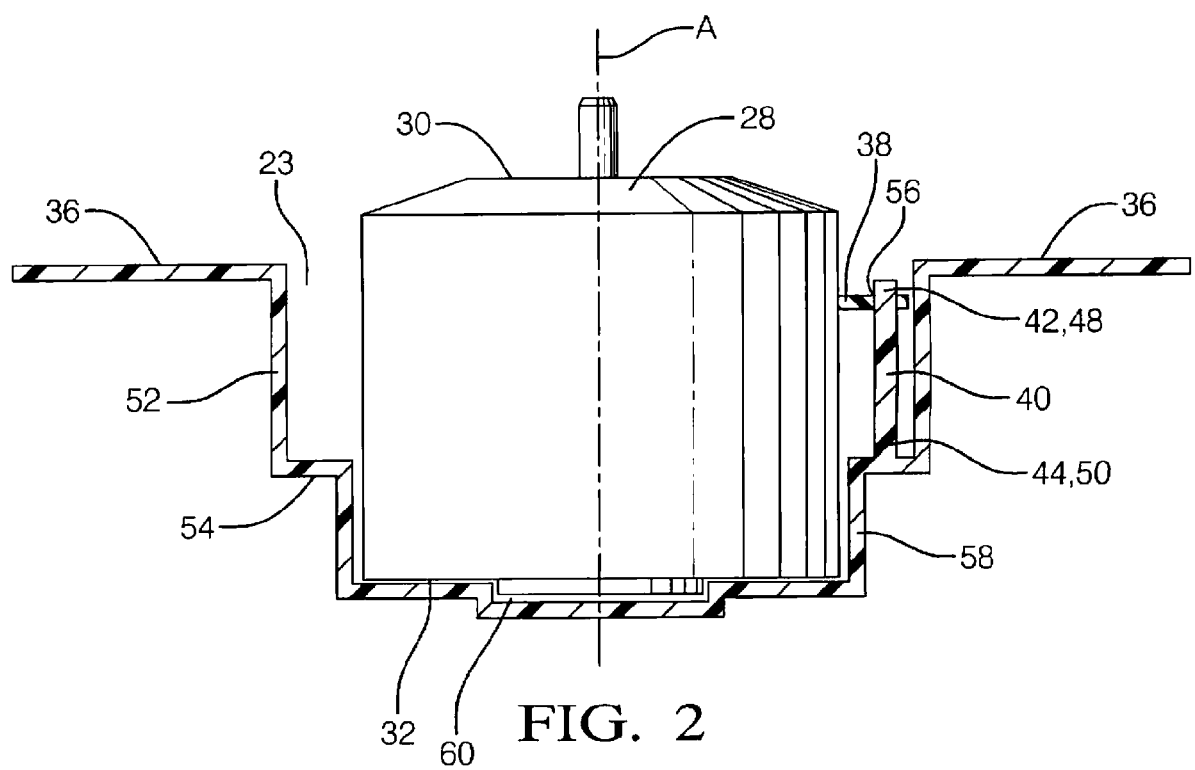
FIG. 2 is a cross-sectional view of an embodiment of the invention illustrating the support disposed at the upper end of the post.
Figure 3:
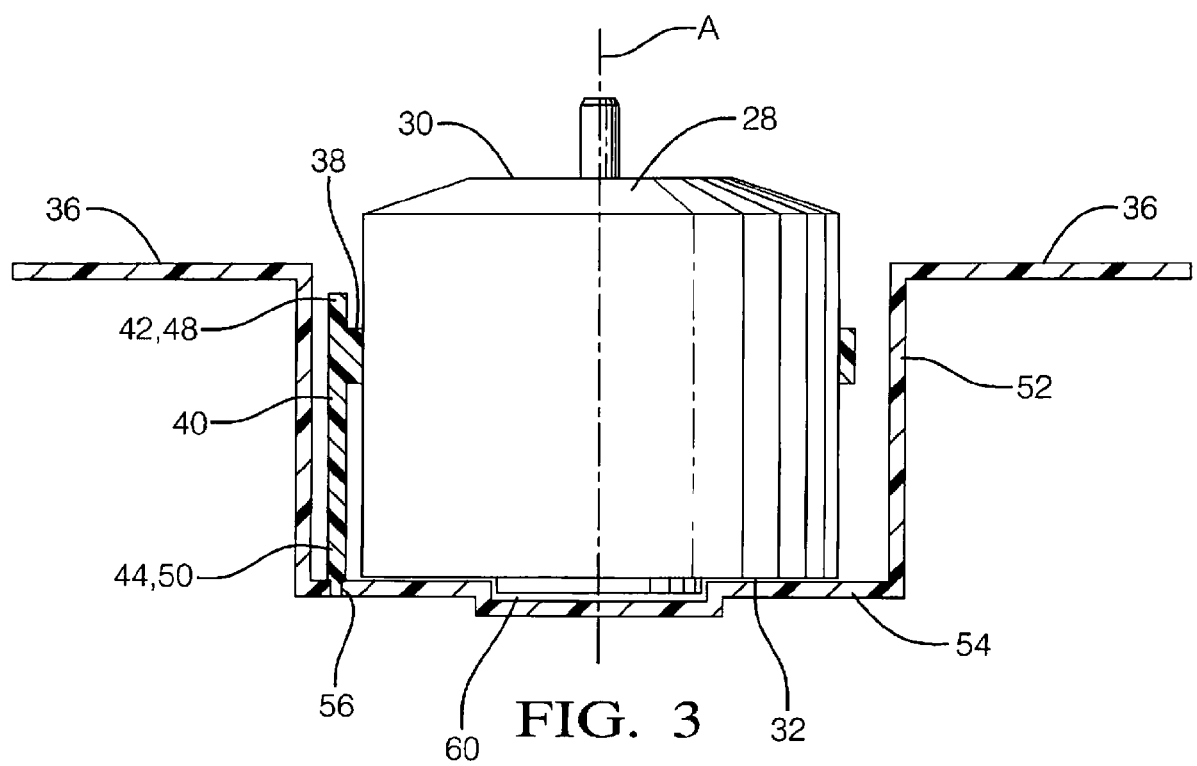
FIG. 3 is a cross-sectional view of an alternative embodiment of FIG. 2 illustrating a mechanical connection between the post and the housing.
Figure 4:
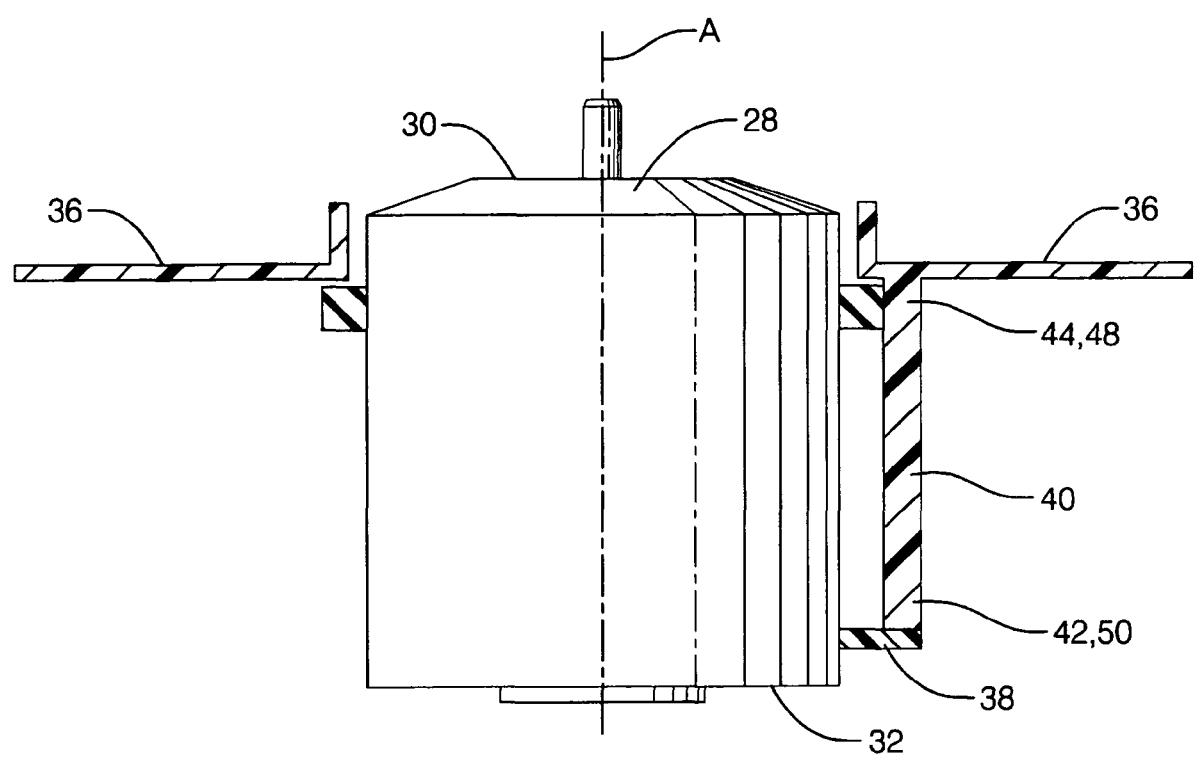
FIG. 4 is a cross-sectional view of an embodiment of the invention illustrating the support disposed at the lower end of the post.

The housing 22 presents an opening 23 defining a rim 36 surrounding the axis A, as shown in FIGS. 2-4. A plurality of mounting supports 38 extend from the motor 28 for mounting the motor 28 on the housing 22. The supports 38 are spaced from one another circumferentially about the axis A.

A plurality of posts 40 extend axially between a first end 42 and a second end 44 and interconnect the supports 38 and the rim 36 for supporting the motor 28. Each post 40 is circular in cross-section; however, a variety of shapes may be used to give optimal torsional stiffness, radial stiffness, and compressive and bending stresses.

FIGS. 2-4 illustrate three posts 40 and three corresponding supports 38 spaced from one another circumferentially about the motor 28. In all embodiments the posts 40 act as columns to support 38 the weight of the motor 28 and any attached fan assembly 46. The posts 40 also act as cantilever beams resisting the motor torque pulses and radial forces.

The system 20 is distinguished by the first end 42 of each post 40 being supported by one of the supports 38 and the second end 44 of each post 40 being supported by the housing 22. Each post 40 is flexible for allowing for bending of the post 40 between the first and second ends 42, 44 allowing movement of the motor 28 relative to the housing 22 while damping vibrations of the motor 28 relative to the housing 22. The posts 40 may be of plastic and molded integrally with other components, such as the housing 22 as illustrated in FIGS. 2 and 3.

In the embodiments shown in FIGS. 2 and 3, the first ends 42 of the posts 40 are upper ends 48 and the supports 38 are disposed at the upper ends 48. The second ends 44 of the posts 40 are lower ends 50 that are supported from the rim 36.

An intermediate extension 52 extends downwardly from the rim 36 in radially spaced relationship to each of the posts 40 and is integral with the rim 36. A ledge 54 extends radially inwardly from the extension 52 to the lower ends 50 of the posts 40 and is integral with the extension 52.

In the embodiment shown in FIG. 2, the lower ends 50 of the posts 40 are integral with the ledge 54. A mechanical connection 56 is disposed between the upper ends 48 of the posts 40 and the supports 38. The mechanical connection 56 is a tongue and groove connection 56 wherein the post 40 has a groove and the support 38 acts as the tongue. However, the connection 56 may also be a screw or weld or the connection 56 can be formed out of the upper end 48 of each post 40 by applying heat to the upper end 48 of the post 40 after the post 40 is inserted into a hole in the supports 38.

A motor casing 58 extends and depends from the ledge 54 of the extension 52 and extends across the bottom end 32 of the motor 28. The casing 58 is integral with the ledge 54 and may include holes (not shown) for portions of the motor 28 to extend through if required by a motor's shape.

A stabilizer 60 interconnects the bottom end 32 of the motor 28 and the casing 58 to stabilize unbalanced loads created by the attachment of a fan assembly 46 to a shaft of the motor 28. The stabilizer 60 may be a finger or a plurality of fingers integral with and/or extending upwardly from the motor casing 58 and attached mechanically to the motor 28. The stabilizer 60 may also be a groove in the motor casing 58 wherein the bottom end 32 of the motor 28 fits into the groove.

In the embodiment shown in FIG. 3, the extension 52 is mechanically connected to the rim 36 and the ledge 54 is integral with the extension 52. A cage 62 surrounds and supports 38 the motor 28. The supports 38 are integral with the cage 62 and integral with the upper ends 48 of the posts 40. The lower ends 50 of the posts 40 are mechanically connected to the ledge 54. The mechanical connection 56 is preferably a screw; however, it may be a tongue and groove connection 56 or other known mechanical connection 56.

The embodiment shown in FIG. 4 is most suitable for motors 28 that do not require forced air cooling and is the most cost effective embodiment. The first ends 42 of the posts 40 are lower ends 50 and the supports 38 are disposed at the lower ends 50. The second ends 44 of the posts 40 are upper ends 48 supported from the rim 36.

A mechanical connection 56 is disposed between the lower ends 50 of the posts 40 and the supports 38. The mechanical connection 56 is a tongue and groove connection 56. However, similar to the first embodiment, the mechanical connection 56 may be a screw, a weld, a portion of the post 40 formed by applying heat to the post 40, or other known mechanical connections 56.

The supports 38 are mounted at a position between the top end 30 of the motor 28 and the bottom end 32 of the motor 28. A guide 64 extends upwardly from the rim 36 for limiting radial movement of the motor 28. The rim 36 is integral with the guide 64 and the posts 40 are integral with the rim 36.

A foam seal 66 is disposed circumferentially about the motor 28 between the extension 52 and the motor 28 and axially between the supports 38 and the rim 36 for sealing the housing 22 about the motor 28. The foam seal 66 prevents air and particles from entering the housing 22.

While the invention has been described with reference to an exemplary embodiment, it will be understood by those skilled in the art that various changes may be made and equivalents may be substituted for elements thereof without departing form the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heating, ventilating and air conditioning (HVAC) system comprising;
    a housing having an inlet for receiving air and at least one outlet for delivering air, wherein said housing includes a top end and a bottom end,
    a motor disposed in said housing and having an axis extending between said top end and said bottom end for driving a blower to move air through said housing,
    a heat exchanger system disposed in said housing for conditioning air moving through said housing,
    an opening defined within said housing,
    a plurality of mounting supports extending from said motor for mounting said motor on said housing,
    a plurality of posts extending axially between said supports and said housing for supporting said motor, wherein each of said plurality of posts includes a first end and a second end axially spaced from said first end,
    characterized by said first end of each post being supported by one of said supports and said second end of each post being supported by said housing, wherein each of said posts being sufficiently flexible for allowing for bending of said post between said first end and said second end by said housing allowing movement of said motor relative to said housing for dampening vibrations of said motor.

2. A system as set forth in claim 1 further defined by said supports being spaced from one another circumferentially about said axis.

3. A system as set forth in claim 1 further defined by each post being circular in cross-section.

4. A system as set forth in claim 1 including three posts and three supports.

5. A system as set forth in claim 1 wherein said housing includes a rim about said axis and said posts are disposed between said supports and said rim.

6. A system as set forth in claim 5 further defined by said first ends of said posts being upper ends and said supports being disposed at said upper ends and said second ends of said posts being lower ends supported from said rim.

7. A system as set forth in claim 6 including an intermediate extension extending downwardly from said rim in radially spaced relationship to each of said posts and a ledge extending radially inwardly from said extension to said lower ends of said posts for supporting each post by said housing.

8. A system as set forth in claim 7 further defined by said extension being integral with said rim and said ledge being integral with said extension and said lower ends of said posts being integral with said ledge.

9. A system as set forth in claim 8 including a mechanical connection between said upper ends of said posts and said supports.

10. A system as set forth in claim 8 including a motor casing depending from and integral with said ledge of said extension and extending across said bottom end of said motor.

11. A system as set forth in claim 10 including a stabilizer interconnecting said bottom end of said motor and said casing.

12. A system as set forth in claim 8 wherein said extension is mechanically connected to said rim and said ledge is integral with said extension.

13. A system as set forth in claim 12 including a cage surrounding and supporting said motor, said supports being integral with said cage and integral with said upper ends of said posts, said lower ends of said posts being mechanically connected to said ledge.

14. A system as set forth in claim 5 further defined by said first ends of said posts being lower ends and said supports disposed at said lower ends, said second ends of said posts being upper ends supported from said rim.

15. A system as set forth in claim 14 including a mechanical connection between said lower ends of said posts and said supports.

16. A system as set forth in claim 14 further defined by said supports being mounted at a position between said top end of said motor and said bottom end of said motor.

17. A system as set forth in claim 14 including a guide extending upwardly from and integral with said rim for limiting radial movement of said motor.

18. A system as set forth in claim 17 further defined by said posts being integral with said rim and said rim being integral with said guide.

19. A system as set forth in claim 14 including a foam seal disposed circumferentially about said motor between said extension and said motor and axially between said supports and said rim for sealing said housing about said motor.

20. A heating, ventilating and air conditioning (HVAC) system comprising;
    a housing having an inlet for receiving air and at least one outlet for delivering air,
    a motor disposed in said housing and having an axis extending between a top end and a bottom end for driving a blower to move air through said housing,
    a heat exchanger system disposed in said housing for conditioning air moving through said housing,
    wherein said housing includes a rim defining an opening disposed about said axis,
    three mounting supports extending from said motor and spaced from one another circumferentially about said axis for mounting said motor from said rim,
    three posts each extending axially between a first end and a second end and disposed between said supports and said rim for supporting said motor,
    each of said posts having a solid plastic circular cross-section, and
    characterized by said first end of each post being supported by one of said supports and said second end of each post being supported by said rim with each of said posts being sufficiently flexible for allowing for bending of said post between said first end and said second end allowing movement of said motor relative to said housing while dampening vibrations of said motor.

21. A system as set forth in claim 20 including;
    said first ends of said posts being upper ends and said supports being disposed at said upper ends and said second ends of said posts being lower ends supported by said rim,
    an intermediate extension extending downwardly from said rim in radially spaced relationship to each of said posts and integral with said rim,
    a ledge extending radially inwardly from said extension to said lower ends of said posts for supporting each post by said housing,
    said ledge being integral with said extension, and
    a stabilizer interconnecting said bottom end of said motor and said housing.

22. A system as set forth in claim 21 including;
    a mechanical connection between said upper ends of said posts and said supports,
    said lower ends of said posts being integral with said ledge,
    a motor casing depending from and integral with said ledge of said extension and extending across said bottom end of said motor.

23. A system as set forth in claim 21 including;
said extension being mechanically connected to said rim and said ledge being integral with said extension,
a cage surround and supporting said motor, and
said supports being integral with said cage and integral with said upper ends of said posts, said lower ends of said posts being mechanically connected to said ledge.

24. A system as set forth in claim 20 including;
said first ends of said posts being lower ends and said supports disposed at said lower ends and said second ends of said posts being upper ends supported from said rim,
a mechanical connection between said bottom ends of said posts and said supports,
said mounting supports being mounted at a position between said top end of said motor and said bottom end of said motor,
a guide extending upwardly from and integral with said rim for limiting radial movement of said motor,
said posts being integral with said rim and said rim being integral with said guide, and
a foam seal disposed circumferentially about said motor between said extension and said motor and axially between said supports and said rim for sealing said housing about said motor.

* * * * *